Patented Feb. 17, 1953

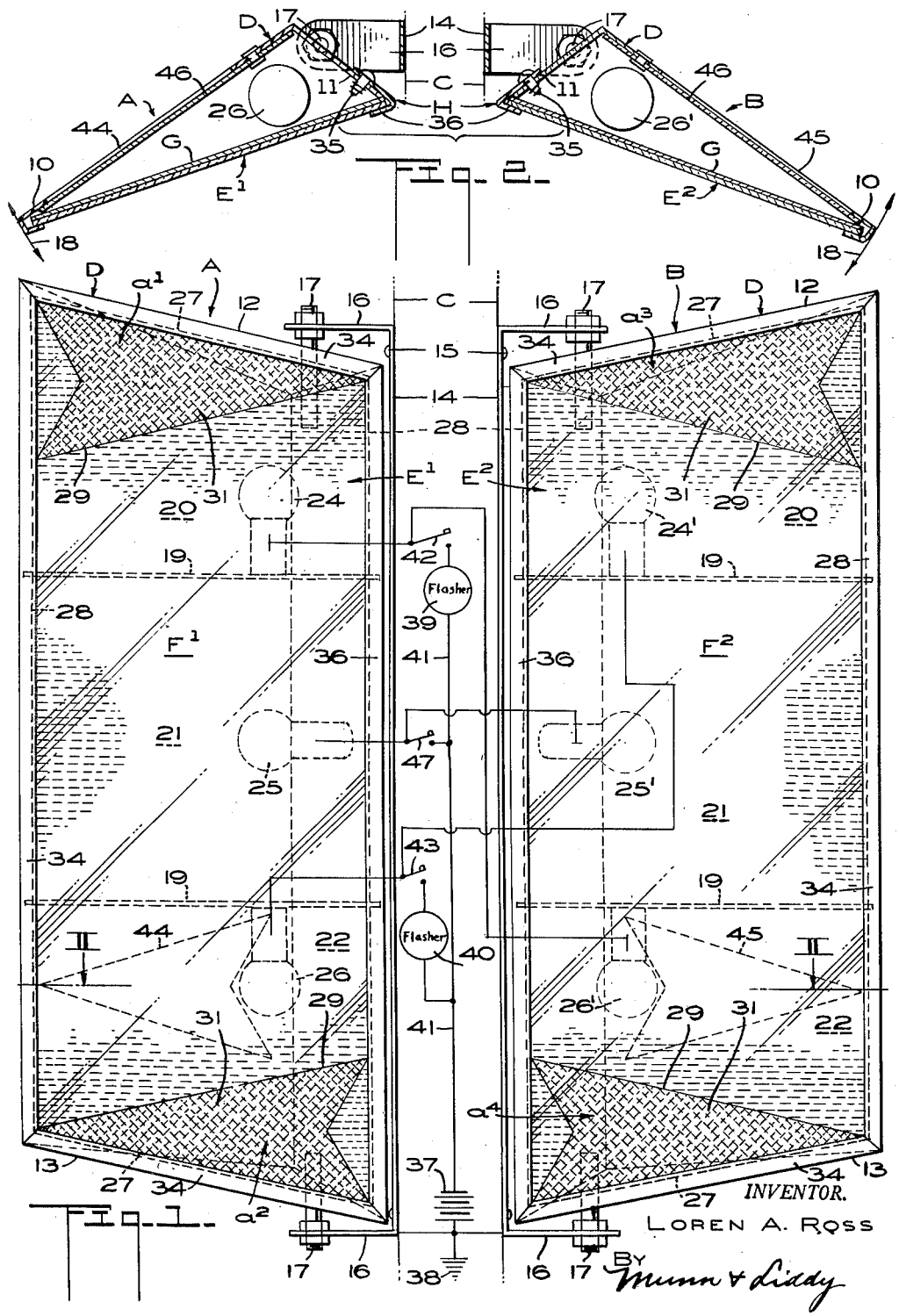

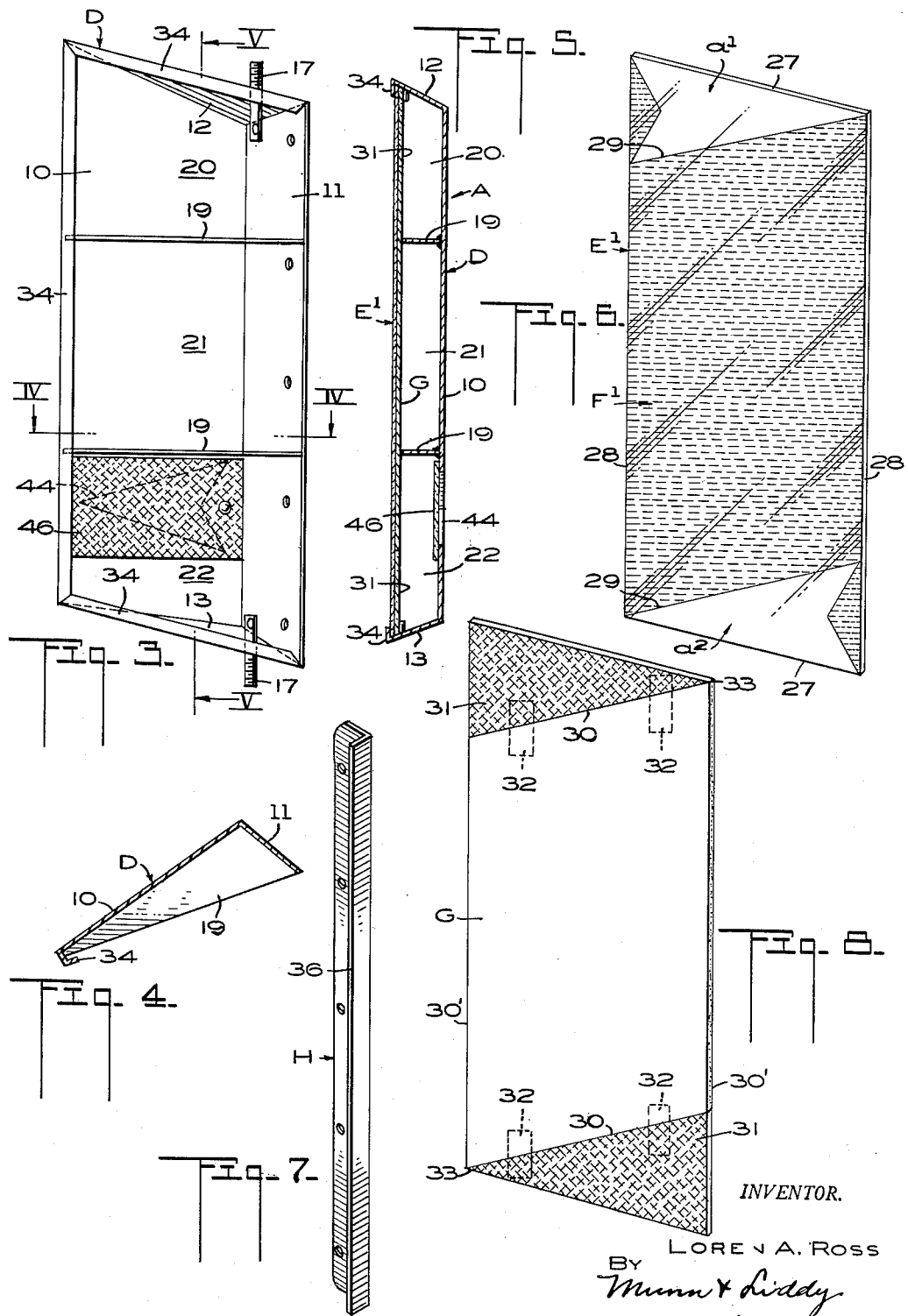

2,629,087

UNITED STATES PATENT OFFICE 2,629,087

COMBINED MIRROR AND DIRECTION INDICATOR FOR VEHICLES

Loren A. Ross, Richmond, Calif.

Application November 13, 1951, Serial No. 255,882

8 Claims. (Cl. 340—107)

1

The present invention relates to improvements in a combined mirror and direction indicator for vehicles. It consists of the combinations, constructions, and arrangement of parts, as hereinafter described and claimed.

An object of my invention is to provide a device of the character set forth, which is adapted to be mounted on a vehicle so that the driver thereof can give warning signals to both oncoming and trailing drivers of contemplated changes in direction. At the same time, the device provides a mirror so that the driver of the vehicle on which the device is mounted can observe traffic at any time, epecially while giving direction signals and making turns.

It is proposed in this invention to mount a combined mirror and direction indicator on each side of a vehicle so as to afford the driver ample view of traffic, and allowing the same signal to be given on both sides of the vehicle in order to assure adequate warning to drivers of other vehicles. Both signals are actuated by common switches.

More specifically described, I provide a direction indicator having a rhomboid-shaped panel defining oblique ends. This panel has a mirror thereon, which likewise has a rhomboid outline with oblique ends. The oblique ends of the panel and mirror coact to define indicating arrows pointing in opposite lateral directions. This panel is mounted on a casing having lights arranged therein, which may be selectively placed in operation to give the necessary illumination for the arrows. Thus I eliminate the requirement of having a signal arm.

Other objects and advantages will appear as the specification continues. The novel features will be set forth in the claims hereunto appended.

Drawings

For a better understanding of the invention, reference should be had to the accompanying drawings, forming part of this application, in which:

Figure 1 is an elevational view of a pair of my combined mirror and direction indicators, as observed by the driver of the vehicle on which they are attached;

Figure 2 is a transverse sectional view taken along the horizontal plane II—II of Figure 1;

Figure 3 is a front view of the casing that I employ for one of the devices;

Figures 4 and 5 are horizontal and vertical sectional views taken along the line IV—IV and V—V, respectively, of Figure 3, it being noted that the mirrored panel and a protective backing sheet therefor having been applied to the casing in Figure 5;

Figure 6 is an oblique view of the mirrored panel and its transparent arrow portions;

2

Figure 7 is an isometric view of an angle bracket that I utilize for removably securing the panel and its backing sheet to the casing; and Figure 8 is an oblique view of the rhomboid-shaped protective backing sheet and the colored panes, the latter being secured to opposing oblique ends of this sheet.

While I have shown only the preferred form of my invention, it should be understood that various changes, or modifications, may be made within the scope of the annexed claims without departing from the spirit thereof.

Detailed description

Referring now to Figures 1 and 2 of the drawings, I have shown a pair of my combined mirror and direction indicators therein, which are designated generally at A and B. These devices are adapted to be mounted on opposite sides of a vehicle, which is suggested fragmentarily at C, in such a manner that they may be seen by the driver of this vehicle, and further observed clearly by drivers of other vehicles, both approaching and trailing the vehicle C.

It will be noted that the devices A and B are identical with one another, with the exception of the fact that they are left-handed and right-handed, respectively. The interior details of the device A are fully disclosed in the drawings.

As clearly shown in Figures 1 to 5, inclusive, the device A includes a casing D, which is formed to present angularly-related rear walls 10 and 11. This casing is made with sloping top and bottom walls 12 and 13, respectively. When viewing the casing from the front thereof, as in Figure 1, the casing has a rhomboid-shaped outline. The device B has these same arrangements.

For the purpose of supporting the casings D, I have provided brackets 14, which are fastened to opposite sides of the vehicle C by screws 15, or other suitable securing means. These brackets are fashioned with out-turned legs 16—16, which straddle the casings. The latter have pintle pins 17—17 fixed thereto so as to extend vertically therefrom, these pins being journalled in the legs 16—16.

It will be seen that the pintle pins 17—17 of each casing are aligned with one another. Thus the casings D may be rotated about the vertical axes of these pins, as suggested by the swing arrows 18 in Figure 2, so that panels E1 and E2 mounted in the fronts of the casings of the devices A and B, respectively, may be viewed by the driver of the vehicle C.

Partitions 19 of triangular-shaped outlines are secured to the casings D on the interiors thereof to provide separated compartments 20, 21 and 22 arranged one above the other. The compartments of the device A are provided with electric lights 24, 25 and 26, as shown in Figure 1. Likewise, the device B has electric lights 24', 25' and 26' disposed in its compartments.

With particular reference to Figures 1 and 6, I show the panels E1 and E2 as having quadrilateral or rhomboid outlines, which define oblique ends 27 and lateral opposing edges 28. These panels have quadrilateral or rhomboid mirror sections F1 and F2 thereon, respectively, which are smaller than the panels and define oblique ends 29. The lateral edges of each panel and its mirror section register with one another.

In Figure 1, I show the oblique ends of the panel E1 and mirror section F1 of the device A as converging toward opposing lateral edges 28 of that panel to form direction-indicating arrows $a1$ and $a2$ at the top and bottom of this panel, respectively, these arrows pointing in opposite directions. In a like manner, the panel E2 and mirror section F2 of the device B form direction-indicating arrows $a3$ and $a4$ pointing oppositely.

The mirror sections F1 and F2 may be regarded as being "non-transparent," since they are coated in the usual manner to provide reflecting surfaces, the latter facing toward the interior of the casings. However, the arrow portions $a1$ to $a4$, inclusive, are transparent so as to permit passage of light therethrough.

In order to protect the coated surfaces of the mirror sections F1—F2, I provide sheets G of suitable material, for instance corrugated cardboard. One sheet has been shown in Figure 8 as having an equilateral or rhomboid outline, corresponding in shape with the mirror sections F1—F2. Oblique ends 30 of the protective sheets G are adapted to register with the oblique ends 29 of the mirrors, while opposing lateral edges 30' of these sheets are disposed in registration with the lateral edges 28 of the panels.

For the purpose of imparting the necessary color to the direction-indicating arrows, I make use of panes 31 of suitable color, for instance amber. These panes are triangular in outline, and are secured to the oblique ends 30 of the sheets G by transparent tape 32, or other fastening means, with the apexes 33 of the panes pointing in opposite directions (see Figure 8). Moreover, these panes are disposed in the planes of the sheets G, as shown in Figure 5. Thus the sheets G and their attached panes are given a rhomboid outline corresponding with the perimeter of the panels E1 and E2.

During the assembling of the devices A and B, the protective sheets G, and their colored panes 31, are inserted under marginal flanges 34, which extend along three sides of the open front of the casings D—D. These sheets bear against the partitions 19 in light-tight relation therewith to preclude passage of light between the compartments 20, 21 and 22. The sheets G—G not only afford protection for the reflecting surfaces of the mirror sections, but further serve to position the colored panes 31 in proper relation with the casings D—D.

After the protective sheets have been inserted, the panels E1 and E2 are placed over these sheets, with the panels being introduced underneath the marginal flanges 34. At this time, the colored panes 31 underlie the arrow portions $a1$ to $a4$, inclusive.

In Figures 1, 2 and 7, of the drawings, I disclose angle-shaped members H, which may be removably attached to the rear casing walls 11 by screws 35. These members have flanges 36 disposed to bear against the panels for holding the latter in place. Of course, the flanges 36 could be formed as extensions of the walls 11, and bent over to retain the panels in place.

Turning now to Figure 1, I have shown the necessary wiring diagram therein, whereby the driver of the vehicle C may give proper warnings to the drivers of other vehicles, both approaching and trailing. For this purpose, I have disclosed a source of electricity, such as a battery 37 having one of its terminals grounded at 38. Also, the casings D and D are grounded.

Conventional "flashers" 39 and 40 are connected by a wire 41 to the battery 37, and are designed to produce blinking of the signal lights 24—26' and 26—24' when these lights are activated. For indicating a "right" turn, a switch 42 is closed for connecting the "flasher" 39 to the electric lights 24 and 26'. Thus the closing of this one switch will cause the arrow portions $a1$ and $a4$ to be illuminated at the same time, these arrows being disposed on opposite sides of the vehicle C.

Assuming that a "left" turn is contemplated, the driver closes a switch 43, which will connect the "flasher" 40 with the electric lights 26 and 24'. This will illuminate both arrow portions $a2$ and $a3$ simultaneously.

Of course, the arrow portions $a1$ to $a4$, inclusive, are viewable by the driver and the drivers of trailing vehicles. In order to provide warnings to oncoming or approaching drivers, the devices A and B are provided with direction-indicating openings 44 and 45, respectively, in their rear walls 10 (see Figures 1, 2, 3 and 5). These openings are covered by amber or other colored panes 46.

Accordingly, when the light 26 is activated for designating a "left" turn, the arrow opening 44 will give the same warning signal to an oncoming driver. In the same way, upon activating the light 26' to indicate a "right" turn, the arrow opening 45 will warn an oncoming driver of the contemplated change in direction of the vehicle C.

It will be appreciated that the driver of the vehicle on which the devices A and B are mounted can observe traffic while giving the signals by glancing in the mirrors F1 and F2. While doing this, the driver is assured of the fact that the signals are working. If for any reason the turn should be delayed due to traffic conditions, the driver will be apprised of this fact by watching the mirrors. Of course, the switches 42—43 can be arranged on the dashboard within easy reach of the driver.

Fogging on the mirrors F1 and F2 is prevented by the lights 25—25', which are arranged in the compartments 21—21 of the devices A—B, respectively. These warming lights are activated by closing a switch 47.

As previously pointed out, the devices A and B may be adjusted about the vertical axes of the pintle pins 17—17 to allow the vehicle driver to obtain a proper view of traffic in the mirrors F1—F2, while displaying the warning signals to other drivers.

Although I have shown and described two direction-indicating arrows on each of the panels E1 and E2, it will be realized that a single arrow could be provided on each panel. For example, the device A could be fashioned with only the left-hand direction-indicating arrow $a2$, while the panel E2 could carry the right-hand indicating arrow $a4$. Accordingly, I have used the expression "quadrilateral" in certain of the appended claims in describing the panels. In this case, the arrows 44—45 still could be provided on the device A and B, respectively, so as to display the warning signals to oncoming drivers, or other traffic.

I claim:

1. In a device of the character described: a quadrilateral panel defining an oblique end and lateral opposing edges; this panel having a non-transparent quadrilateral section, which is smaller than the panel and providing an oblique end; these oblique ends converging toward a lateral edge of the panel to form a direction-indicating arrow; the portion of the panel providing the arrow being transparent; and means for illuminating the arrow portion to give a direction signal.

2. In a device of the character described: a quadrilateral panel defining an oblique end and lateral opposing edges; this panel having a non-transparent quadrilateral section, which is smaller than the panel and providing an oblique end; these oblique ends converging toward a lateral edge of the panel to form a direction-indicating arrow; the portion of the panel providing the arrow being transparent; and means for illuminating the arrow portion to give a direction signal; said non-transparent section constituting a mirror so that a driver can observe traffic while giving the signal with the arrow.

3. In a device of the character described: a rhomboid panel defining oblique ends and lateral opposing edges; this panel having a non-transparent rhomboid section, which is smaller than the panel and providing oblique ends; the oblique ends of the panel and said non-transparent section sloping oppositely relative to each other to define direction-indicating arrows pointing in opposite directions; the portions of the panel providing the arrows being transparent; and means for selectively illuminating the arrow portions to give direction signals.

4. In a device of the character described: a rhomboid panel defining oblique ends and lateral opposing edges; this panel having a non-transparent rhomboid section, which is smaller than the panel and providing oblique ends; the oblique ends of the panel and said non-transparent section sloping oppositely relative to each other to define direction-indicating arrows pointing to opposite directions; the portions of the panel providing the arrows being transparent; and means for selectively illuminating the arrow portions to give direction signals; said non-transparent section constituting a mirror so that a driver can observe traffic while giving direction signals with the arrows.

5. In a device of the character described: a quadrilateral panel defining an oblique end and lateral opposing edges; this panel having a non-transparent quadrilateral section, which is smaller than the panel and defining an oblique end; these oblique ends converging toward a lateral edge of the panel to form a direction-indicating-arrow; means for illuminating the arrow portion to give a direction signal; said non-transparent section constituting a mirror so that a driver can observe traffic while giving the signal with the arrow; a protective sheet covering the rear reflecting surface of the mirror section and corresponding in shape therewith; and a colored pane secured to this protective sheet to underlie the arrow portion of the panel.

6. In a device of the character described: a quadrilateral panel defining an oblique end and lateral opposing edges; this panel having a non-transparent quadrilateral section, which is smaller than the panel and defining an oblique end; these oblique ends converging toward a lateral edge of the panel to form a direction-indicating arrow; means for illuminating the arrow portion to give a direction signal; said non-transparent section constituting a mirror so that a driver can observe traffic while giving the signal with the arrow; a protective sheet covering the rear reflecting surface of the mirror section and corresponding in shape therewith; and a colored pane secured to this protective sheet to underlie the arrow portion of the panel; the colored pane being disposed in the plane of the protective sheet and forming a continuation thereof.

7. In a device of the character described: a rhomboid panel defining oblique ends and lateral opposing edges; this panel having a non-transparent rhomboid section, which is smaller than the panel and defining oblique ends; the oblique ends of the panel and said section sloping oppositely relative to each other to form direction-indicating arrows pointing in opposite directions; the portions of the panel providing the arrows being transparent; means for selectively illuminating the arrow portions to give direction signals; said non-transparent section constituting a mirror so that a driver can observe traffic while giving direction signals with the arrows; a rhomboid protective sheet covering the rear reflecting surface of the mirror section and corresponding in shape therewith; and triangular colored panes secured to the oblique ends of the protective sheet to underlie the arrow portions.

8. In a device of the character described: a rhomboid panel defining oblique ends and lateral opposing edges; this panel having a non-transparent rhomboid section, which is smaller than the panel and defining oblique ends; the oblique ends of the panel and said section sloping oppositely relative to each other to form direction indicating arrows pointing in opposite directions; the portions of the panel providing the arrows being transparent; a casing disposed in back of the panel, and having partitions dividing the interior of the casing into separated compartments arranged in back of the arrow portions; a rhomboid protective sheet covering the rear of the non-transparent section of the panel and corresponding in shape therewith; triangular colored panes secured to the oblique ends of the protective sheet to underlie the arrow portions; and means for selectively illuminating those compartments in back of the arrows to give direction signals; these partitions abutting the protective sheet in light-tight relation therewith to preclude passage of light between compartments, and constituting supports for holding this sheet against the panel.

LOREN A. ROSS.

REFERENCES CITED

The following references are of record in the file of this patent:

UNITED STATES PATENTS

| Number | Name | Date |
|---|---|---|
| 1,304,370 | Ray | May 20, 1919 |
| 1,349,191 | Duncomb | Aug. 10, 1920 |
| 2,050,779 | Blanchard | Aug. 11, 1936 |
| 2,580,014 | Gazda | Dec. 25, 1941 |